Figure 1:
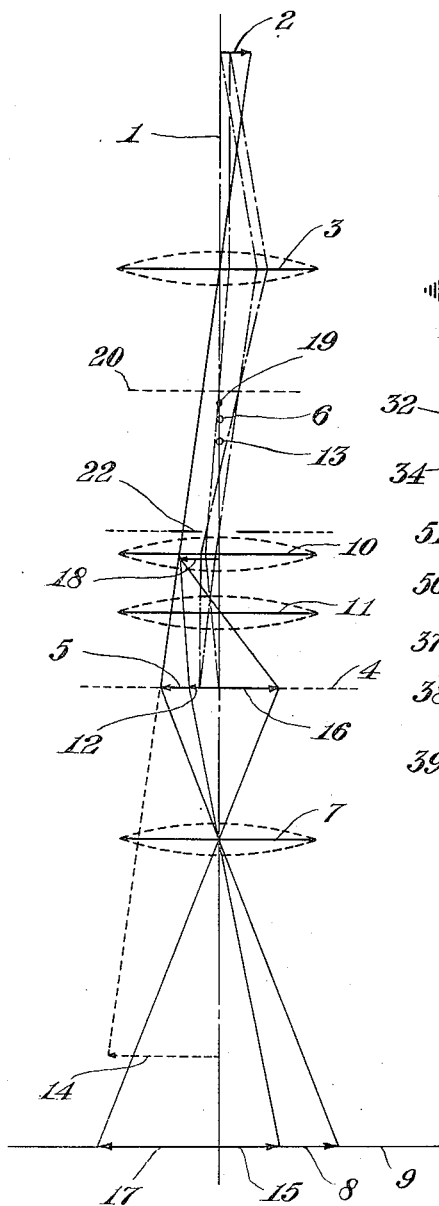

Jan. 10, 1950  J. B. LE POOLE  2,494,442
ELECTRON-MICROSCOPE COMPRISING MAGNETIC FOCUSING
Filed Jan. 31, 1947

JAN BART LE POOLE
INVENTOR.

BY

AGENT.

Patented Jan. 10, 1950

2,494,442

UNITED STATES PATENT OFFICE 2,494,442

ELECTRON MICROSCOPE COMPRISING MAGNETIC FOCUSING

Jan Bart Le Poole, Eindhoven, Netherlands, assignor to Hartford National Bank and Trust Company, Hartford, Conn., as trustee Application January 31, 1947, Serial No. 725,669
In the Netherlands January 5, 1946

Section 1, Public Law 690, August 8, 1946
Patent expires January 5, 1966

6 Claims. (Cl. 250—49.5)

In electron microscopes the image is in most cases produced by two lenses, an objective on which the resolving power is substantially dependent, and a projection lens by which the image produced by the objective is projected in enlarged size onto a luminous screen.

In microscopes in general and in electron microscopes in particular it is desirable that the magnification may be of different values, in view of the limited dimensions of the field of view. In this case it is possible, by means of a comparatively small magnification to obtain at first a view of the whole of the object or of a large portion thereof and to select a determined portion of which subsequently a stronger magnification is made for completion of the examination.

In light microscopes variation in magnification is in most cases effected by change of the objective. A similar method is also known for electron microscopes but in this case the projection lens instead of the objective is changed. For this purpose the projection lens is constituted by two parts of different focal lengths each of which exerts a magnifying action. Either of them may be switched-in at will so that different magnifications may be chosen. Although practical realisation of this method of control of the magnification is known only for a microscope comprising electrostatic projection, the idea of using such a dual lens (hereinafter referred to as the "control lens") also in microscopes comprising magnetic projection is not new.

It is the object of the present invention to provide a control lens for an electron microscope which permits to obtain a very large range of magnification.

It is another object of the invention to provide a control lens which makes it possible to obtain a continuous variation in magnification between the minimum and maximum values of magnification.

It is a further object of the invention to provide a control lens which can be used for producing diffraction images for the determination of the structure of a substance constituting the object under examination.

Other objects and advantages of the invention will become apparent from the following detailed description thereof.

The electron microscope according to the invention comprises a multiple lens system including an objective and a control lens; if desired, a projection lens may also be included. The control lens is made in two parts, each part having an adjustable focal length. One of the parts is adapted to focus, in reduced size, an intermediate image produced by the objective behind said part of the control lens. The other part of the lens is adapted to focus an intermediate image produced by the objective in front of that part of the lens. An inverted image is produced thereby in the same image area in an enlarged size.

In order to obtain clear images, it is necessary to displace the intermediate images to a certain extent. This can be effected in known manner by a small variation in the focal length of the objective. The variation in the focal lengths may be carried out very easily and is effected in the case of magnetic lenses by variation in the strength of the energising current and in the case of electrostatic lenses by variation in the voltage set up between the electrodes of the lens.

The control ranges of the focal lengths of the two parts of the lens are preferably chosen such that upon change a continuous variation in magnification may be obtained in such manner that the inverted image produced at a determined low value of the energising current or voltage in the magnifying part is of same size as the image produced by the objective in the image area with an infinite focal length of the control lens, hence without after-focusing.

When starting from a currentless or voltageless control lens, the magnification may be gradually reduced to a minimum by gradual increase of the energisation in the reducing part from zero to a determined maximum value; the magnification may be gradually increased by switching-in the energisation in the magnifying part (as a result of which the size of image remains at first unvaried and the image is only inverted) and the subsequent gradual increase of the strength of the energisation.

As mentioned before, the microscope according to the invention may comprise a third lens stage by which the image focused in the image area is projected onto a luminous screen. Although the possibility of utilising three lens stages for the formation of the image is known per se, the apparatus designed hitherto comprised not more than two stages since the magnification obtained thereby is sufficient and the resolving power of the microscope with a proper objective cannot be raised by an increase in the number of stages.

However, in the microscope according to the invention the use of more than two stages is advantageous since the magnification is very small and is less than unit in a large portion of the range of the control lens so that without the use of an additional projection lens a very strong magnification by the objective alone would be required. This large image of the objective would be required to be covered by the control lens, for which purpose the latter would have to be of a correspondingly good quality. This is a disadvantage which is avoided by the use of a separate projection lens.

The control lens in the microscope according to the invention may be used for a further purpose, that is to say, to make the microscope also adapted for producing diffraction images. For this purpose the focal lengths of one part of the control lens and of the objective are so adjusted that the plane normal to the axis at the area of the smallest section of the beam of rays (in the case of parallel rays the focus of the objective) is projected in the image area by the part concerned of the control lens. This being arranged, a diffraction image of the object exposed is produced in the projection area.

It is advantageous to give the focal lengths such values with respect to one another that the real image produced by the objective is located close before the active part of the control lens, and to arrange at this point a diaphragm which is preferably adjustable and movable. In this case the diaphragm permits of selecting any arbitrary points of the object and of collecting the rays issuing from an extremely small surface and exclusively therefrom.

Figure 2:
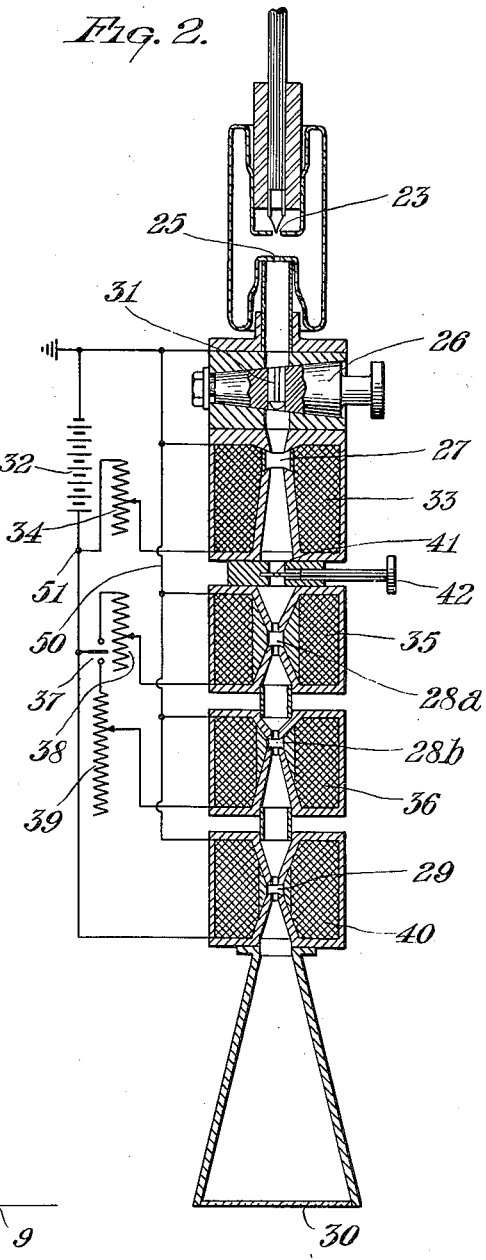

In order that the invention may be clearly understood and readily carried into effect it will be described in more detail with reference to the accompanying drawing in which:

Figure 1 is a diagrammatic view of an electron microscope for use in explaining the invention, and Fig. 2 is a sectional view of an electron microscope embodying the invention.

The principle of the invention will be explained in connection with Fig. 1 which diagrammatically shows an electron microscope. For simplicity Fig. 1 does not take into consideration the actual relationship of the paths of the rays or the relative positions of the several lenses and images, and the electron gun, diaphragms and the condenser are omitted. In Fig. 1 reference numeral 1 indicates the axis of the optical system of the microscope and reference numeral 2 indicates an object which may be introduced in the usual manner through a lock into the exhausted discharge tube (not shown) which extends, of course, on each side of the axis. The cathode rays passing through the object pass through the objective 3 and are focused by the latter in the image area 4 where an enlarged image 5 is produced. The second focus of the objective is located at 6.

The image 5 in its turn serves as an object for the projection lens 7, which throws an enlarged image 8 on a fluorescent screen 9.

In order to enable the image 8 to be reduced and enlarged within broad limits, the former without restriction of the field of view, I provide a control lens system constituted by two control lenses 10 and 11, which serve to decrease and increase respectively, the magnification.

All the lenses may be of the usual shape, for example that of a magnet coil comprising pole pieces.

When the control lens 10 is made operative by switching in the current in the magnet coil of this lens stage, the image in the projection area 4 is reduced, for example, to 12. Since switching-in of the control lens 10 would result in the image being rendered vague, the focal length of the objective 3 is required to be also increased, although to a small extent. In this case the second focus is positioned at 13 and the image produced by the objective is displaced to 14. The control lens 10 causes refraction of the rays which would be focused by the objective at 14 and causes the image 14 to be displaced to 12. By means of the projection lens 7 the rays are focused again in the projection area 9 where now the reduced image 15 is produced. Controlling the current strength in the coil of the control lens 10 between zero and maximum enables the size of the image 15 to be varied between that of the image 8 and a minimum; in one practical embodiment this variation goes, for example, from 1 to 1/6. Consequently, if the magnification obtainable by means of the objective 3 and the projection lens 7 is 6000, the control lens 10 alone permits of obtaining a continuous variation in magnification between 1000 and 6000. During this variation the second focus of the objective must be gradually displaced from 13 to 6, but this adjustment is not critical so that the sharpness of the image may be readily retained.

When the control lens 11 is switched-in this produces in the image area 4, with a determined current strength and proper choice of the focal length of the objective 3, an inverted image 16 which is of same size as the image 5 so that the image 17 projected on the screen by the projection lens 7 remains of same size but is only inverted. The intermediate image produced by the objective 3 is in this case required to be displaced from 5 to 18, which is effected by reducing the focal length of lens 3. The second focus is then positioned at 19.

A gradual decrease of the focal length of the control lens 11 and, in view of the sharpness of the image a simultaneous increase of that of the lens 3 enables the final image on the screen 9 to be enlarged to the size required for clearly visible projection of the smallest perceptible details. The control lens 11 permits of increasing the amplification from, for example, 1 to 15 times, so that the total control range is between 1000 and 90,000.

The focal length of control lens 10 may alternatively be so adjusted that in the image area 4 a projection of the plane 20 is obtained, said plane being at right angles to the axis at the point at which the direct and diffracted beams of rays issuing from the object are of smallest section. In the case of beams of parallel rays this is the focus of the lens 3. When this adjustment is effected, a diffraction image appears on the screen. The real image of the object 2 lies in this case at the area 21. At this point, hence at short distance before the control lens 10, provision is made of a diaphragm 22 which is movable and which has an adjustable aperture which may be reduced to, for example, 0.04 mm. in diameter. The focal length of control lens 10 is required to be so adjusted that the plane 20 belongs to the plane 4 as the area of the object belongs to the image area of the control lens 10. If this condition is fulfilled, the known interference images are obtained which are characteristic of the structure of the substance constituting the object.

An electron microscope embodying the invention is illustrated in Fig. 2 in which reference 23 designates a cathode. Arranged near cathode 23 and insulated therefrom against high voltage is an anode 24 in the form of a cup provided with an aperture 25 for the passage of electrons emitted by cathode 23. Adjacent anode 24 is a specimen holder 26 which supports a specimen 31 at an aperture located in the path of the electron beam leaving aperture 25. Beneath holder 26 is an objective 27 having a coil 33 and a control lens system comprising a control lens 28a and a second control lens 28b provided with electromagnet coils 35 and 36 respectively.

Between objective 27 and control lenses 28a and 28b is a diaphragm 41 which may be placed in and removed from the path of the electrons by a knob 42 and which is used to produce diffraction images of the object on the screen. A projection lens 29 having an electromagnetic coil 40 is located beneath the control lenses and the image is projected on a luminescent projection screen 30 provided on a conical end portion of the microscope.

As the general mechanical construction of electron microscopes is well known in the art, a further detailed description of Fig. 2 is believed unnecessary.

Coils 33, 35, 36 and 40 are adapted to be energized from a direct current source 32 having terminal end connected to ground and a second terminal 51. For this purpose one end of each of the coils is connected through a conductor 50 to ground. The other end of coil 33 is connected through a variable resistor 34 to terminal 51 and the other end of coil 40 is connected directly to terminal 51. Coil 35 has one end connected to ground and its other end connected through a variable resistance 38 to one contact of a two-way switch 37 whose movable contact is connected to terminal 51. Coil 36 has one end connected to ground and its other end connected through a variable resistance 39 to the other contact of switch 37.

By varying resistance 34 it is possible to vary the focal length of the objective lens 27 in accordance with the requirements explained above in connection with Fig. 1. The coils 35 and 36 of the control lenses 28a and 28b may be switched on selectively by means of the switch 29. By adjusting the resistances 38 and 39 it is possible to adjust the focal lengths of the lens parts of the control lenses to obtain the results mentioned in connection with Figure 1.

What I claim is:

1. An electron microscope comprising an electrode system for producing an electron beam, a projection lens arranged in the path of the electron beam, an objective arranged in the path of the electron beam between said projection lens and said electrode system, and a control lens system arranged in the path of the electron beam between said objective and projection lens and including a first control lens arranged adjacent the objective and a second control lens arranged adjacent the projection lens, means to adjust the focal length of the said first control lens to produce with said objective said first control lens and the projection lens images of small magnification, and means to adjust the focal length of said second control lens to produce with said objective said second control lens and the projection lens images of a magnification greater than that of said first images.

2. An electron microscope comprising an electrode system for producing an electron beam, a projection lens arranged in the path of the electron beam, an objective arranged in the path of the electron beam between said projection lens and said electrode system, and a control lens system arranged in the path of the electron beam between said objective and projection lens and including a first control lens arranged adjacent the objective and a second control lens arranged adjacent the projection lens, means to adjust the focal length of the said first control lens to produce with said objective said first control lens and the projection lens images of smaller magnification than those images produced by the projection lens and the objective without the control lens system, and means to adjust the focal length of said second control lens to produce with said objective said second control lens and the projection lens images of a magnification greater than those images produced by the projection lens and the objective without the control lens system.

3. An electron microscope comprising an electrode system for producing an electron beam, a projection lens arranged in the path of the electron beam, an objective arranged in the path of the electron beam between said projection lens and said electrode system, and a control lens system arranged in the path of the electron beam between said objective and projection lens and including a first control lens arranged adjacent the objective and a second control lens arranged adjacent the projection lens, and means including an electromagnetic coil and a current supply to adjust the focal length of the said first control lens to produce with said objective said first control lens and the projection lens images of small magnification, and means including an electromagnetic coil and a current supply to adjust the focal length of said second control lens to produce with said objective said second control lens and the projection lens images of a magnification greater than said first images.

4. An electron microscope comprising an electrode system for producing an electron beam, a projection lens arranged in the path of the electron beam, an objective arranged in the path of the electron beam between said projection lens and said electrode system, and a control lens system arranged in the path of the electron beam between said objective and projection lens and including a first control lens arranged adjacent the objective and a second control lens arranged adjacent the projection lens, means to adjust the focal length of the said first control lens to produce with said objective said first control lens and the projection lens images of small magnification, means to adjust the focal length of said second control lens to produce with said objective said second control lens and the projection lens images of a magnification greater than said first images and means for producing diffraction images including a diaphragm disposed in the path of the electron beam at a point in front of the active control lens.

5. An electron microscope comprising an electrode system for producing an electron beam, a projection lens arranged in the path of the electron beam, an objective lens arranged in the path of the electron beam between said projection lens and said electrode system, means to adjust the focal length of the objective lens including a coil adjacent thereto and a current supply therefor, and a control lens system having a given axis and arranged in the path of the electron beam between said objective and projection lens and including a first control lens arranged adjacent the objective and a second control lens arranged adjacent the projection lens, means to adjust the focal length of the said first control lens to project with said objective said first control lens and the projection lens images in a plane normal to the said axis at the area of the smallest section of the electron beam to produce diffraction images thereof, and means to adjust the focal length of said second control lens to produce with said objective said second control lens and the projection lens images of a magnification greater than that produced by the first control lens.

6. An electron microscope comprising an electrode system for producing an electron beam, a projection lens arranged in the path of the electron beam, an objective arranged in the path of the electron beam between said projection lens and said electrode system and including a focussing electromagnetic coil, a source of electric current and a potentiometer for adjusting the current in said coil, and a control lens system arranged in the path of the electron beam between said objective and projection lens and including a first control lens arranged adjacent the objective and including a first electromagnetic focussing coil and a source of electric current therewith, and a second control lens arranged adjacent the projection lens and including a second focussing electromagnetic coil and a source of electric current in series therewith, a potentiometer in series with said first focussing electromagnetic coil and said current supply to adjust the focal length of the said first control lens to produce with said objective said first control lens and the projection lens images of small magnification, and a potentiometer in series with said second focussing electromagnetic coil and said current supply to adjust the focal length of said second control lens to produce with said objective said second control lens and the projection lens images of a magnification greater than that of said first images.

JAN BART LE POOLE.

REFERENCES CITED

The following references are of record in the file of this patent:

UNITED STATES PATENTS

| Number | Name | Date |
| --- | --- | --- |
| 2,233,264 | Marton | Feb. 25, 1941 |
| 2,396,624 | Von Borries | Mar. 12, 1946 |